US008489444B2

(12) United States Patent  
Bhaskaran et al.

(10) Patent No.: US 8,489,444 B2
(45) Date of Patent: Jul. 16, 2013

(54) CHRONICLING FOR PROCESS DISCOVERY IN MODEL DRIVEN BUSINESS TRANSFORMATION

(75) Inventors: Kumar Bhaskaran, Englewood Cliff, NJ (US); Santhosh Babu Kumaran, Peekskill, NY (US); Gopal S. Pingali, Mohegan Lake, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1290 days.

(21) Appl. No.: 11/756,482

(22) Filed: May 31, 2007

(65) Prior Publication Data

US 2008/0300950 A1   Dec. 4, 2008

(51) Int. Cl.
*G06Q 10/00*   (2012.01)

(52) U.S. Cl.
USPC .............. 705/7.31; 705/7.11; 705/37; 703/13

(58) Field of Classification Search
None
See application file for complete search history.

(56) References Cited

U.S. PATENT DOCUMENTS

| | | | | |
|---|---|---|---|---|
| 7,269,569 B2* | 9/2007 | Spira et al. | ................... | 705/7.36 |
| 7,512,544 B2* | 3/2009 | Carter et al. | ................... | 705/7.31 |
| 8,374,888 B2* | 2/2013 | Earles et al. | ...................... | 705/2 |
| 2002/0035495 A1* | 3/2002 | Spira et al. | .......................... | 705/7 |
| 2002/0049687 A1* | 4/2002 | Helsper et al. | ................... | 706/45 |
| 2002/0099578 A1* | 7/2002 | Eicher et al. | ....................... | 705/7 |
| 2002/0099579 A1* | 7/2002 | Stowell et al. | ..................... | 705/7 |
| 2002/0099580 A1* | 7/2002 | Eicher et al. | ....................... | 705/7 |
| 2002/0099598 A1* | 7/2002 | Eicher et al. | ..................... | 705/11 |
| 2002/0143693 A1* | 10/2002 | Soestbergen et al. | ........... | 705/37 |
| 2003/0023477 A1* | 1/2003 | Fergusson et al. | .............. | 705/11 |
| 2003/0074391 A1* | 4/2003 | Carter et al. | ................... | 709/200 |
| 2003/0149578 A1* | 8/2003 | Wong | ................................... | 705/1 |
| 2004/0039630 A1* | 2/2004 | Begole et al. | .................... | 705/11 |
| 2004/0102926 A1* | 5/2004 | Adendorff et al. | ............ | 702/182 |
| 2004/0260582 A1* | 12/2004 | King et al. | .......................... | 705/7 |
| 2005/0071737 A1* | 3/2005 | Adendorff et al. | ............ | 715/500 |
| 2006/0009991 A1* | 1/2006 | Jeng et al. | .......................... | 705/1 |
| 2006/0111921 A1* | 5/2006 | Chang et al. | ....................... | 705/1 |
| 2007/0100595 A1* | 5/2007 | Earles et al. | .................... | 703/13 |
| 2008/0071589 A1* | 3/2008 | Laicher | ............................. | 705/7 |
| 2008/0281660 A1* | 11/2008 | Sajja et al. | ......................... | 705/8 |

OTHER PUBLICATIONS

Horvitz, E. "Coordinate: Probabilistic Forecasting of Presence and Availability", Proceedings of the 18th Conference on Uncertainty and Artificial Intelligence, Edmonton Alberta, Jul. 2002. Morgan Kaufmann Publishers, pp. 224-233.*
Venkatraman, N. (1997). Beyond outsourcing: Managing IT resources as a value center. Sloan Management Review, 38(3), 51-64.*
Boley, Daniel, Vivian Borst, and Maria Gini. "An unsupervised clustering tool for unstructured data." IJCAI 99 Int'l Joint Conf. on Artificial Intelligence. 1999.*
Karypis, George. "Evaluation of Item-Based Top-N Recommendation Algorithms." (2000).*
Tokunaga, Makoto Iwayama Takenobu. "Cluster-based text categorization: a comparison of category search strategies." ACM SIGIR conference on research and development in information retrieval: proceedings. ACM Press, 1995.*

\* cited by examiner

*Primary Examiner* — Gurkanwaljit Singh
(74) *Attorney, Agent, or Firm* — Cahn & Samuels, LLP

(57) ABSTRACT

An electronic chronicling method and system that automatically captures, stores, and organizes various aspects of business processes in real-time. The system allows different role players to analyze, mine, and share selected performance metrics of business processes in the context of various measures involved, including users, systems, applications, processes, etc. The system enables users to analyze and utilize sortable performance metrics with varying degrees of specificity and detail. This analysis and utilization provides an efficient means for the real-time streamlining and optimization of business processes.

10 Claims, 4 Drawing Sheets

CHRONICLING FOR PROCESS DISCOVERY IN MODEL DRIVEN BUSINESS TRANSFORMATION

I. FIELD OF THE INVENTION

This invention relates to an electronic chronicling method and system that captures, stores, and organizes various aspects of individual, group, or organizational business processes in real-time to enable different role players to analyze, mine and share the performance data in the context of the various business processes.

II. BACKGROUND OF THE INVENTION

Business Process Management (BPM) is growing business practice that includes aspects of management and Information Technology (IT) in order to improve a business' efficiencies. BPM utilizes various principles, methods and techniques from the management and IT fields to develop, implement, manage and evaluate operational business processes involving various sources of information, including individuals, groups, organizations, applications, documents, and other information. These operational business processes encompasses numerous repetitive business processes that are utilized by these entities in the course of day-to-day or routine operations. These BPM projects are preformed in an effort to improve operational efficiencies, i.e., making business processes that are more accurate, faster and less expensive, as well as providing decision-makers with reliable data upon which decisions may be made.

While BPM projects seek to improve operational efficiencies within organizations, developing the projects has been a decidedly inefficient task. A recent Gardner Report shows that 40% of the time devoted to BPM projects is spent on process discovery or the collection of information needed to perform the BPM project. Currently, process discovery is performed primarily through a series of interviews with different role players in the business process. Manual and semi-automated analysis of process data is also performed. However, the difficult and time-consuming part of this process is capturing the user's view of the different business processes including tools used, time spent, dependencies on other users, etc. These variables form a large part of the "as is" or current view of the business process.

Notwithstanding the usefulness of the above-described methods, a need still exists for a robust and dynamic electronic chronicling method and system that allows for real-time streamlining and optimization of business processes based on users, tools, and activities.

III. SUMMARY OF THE INVENTION

This invention in at least one embodiment provides a data processing system for discovering business processes, comprising means for chronicling selected activities; means for bookmarking said activities; means for organizing said activities into chronicles; means for accessing and utilizing said chronicles; and means for analyzing said chronicles to derive statistics and summaries.

This invention in at least one embodiment provides a method for discovering business processes, comprising automatically capturing selected activities as they are performed; bookmarking said activities; organizing said activities into chronicles; accessing and utilizing said chronicles; and analyzing said chronicles to derive statistics and summaries.

This invention in at least one embodiment provides a data processing system for discovering business processes, comprising at least one electronic chronicling capture tool; an electronic chronicle repository in communication with said electronic chronicling capture tool; a chronicle navigator in communication with said electronic chronicle repository; and an analysis and mining tool in communication with said electronic chronicle repository.

This invention in at least one embodiment provides a computer program product comprising a computer useable medium including a computer readable program, wherein the computer readable program when executed on a computer causes the computer to automatically capture selected activities as they are performed using at least one electronic chronicling tool; organize said captured activities into chronicles in an electronic chronicle repository; access and utilize said chronicles with a chronicle navigator; and analyze said chronicles with an analysis and mining tool to derive statistics and summaries.

IV. BRIEF DESCRIPTION OF THE DRAWINGS

The present invention is described with reference to the accompanying drawings, wherein.

Given the following enabling description of the drawings, the apparatus should become evident to a person of ordinary skill in the art.

V. DETAILED DESCRIPTION OF THE DRAWINGS

The present invention discloses a system and method that utilizes electronic chronicles (eChronicles) or electronic journals (eJournals) to automate business process discovery. In performing this automated business process discovery, the system employs eChronicling or eJournaling tools that enable different role players in a business organization to capture what they are actually doing in the context of their business processes including artifacts used, users contacted, etc. The resulting eChronicles provide business modelers, such as Web Intermediaries (WBI) modelers, a more accurate and richer description of the "as is" business process than those that result from interviews or surveys. In addition, the eChronicling tools also help to better monitor, validate, and continually adapt a transformed business process. These eChronicling tools can then be used either directly or after modification by a user for Model Driven Business Transformation (MDBT) applications.

Figure 1:
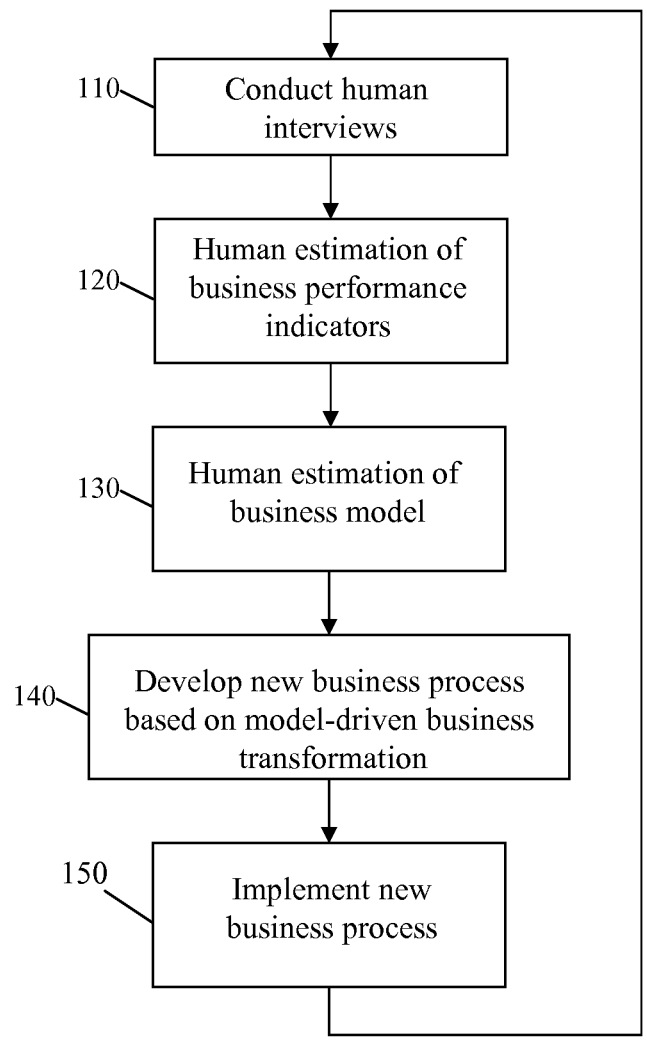
FIG. 1 illustrates a flowchart representing an overview of known methods for updating business processes.

FIG. 1 illustrates an overview of known methods utilized to update business processes. Updating business processes is vital to a business maintaining its efficiency and ensuring that the business processes comply with existing objectives and best practices. Currently, the steps of these methods are highly manual and require human input and involvement in order to be performed. These methods typically begin at step 10 by interviewing persons involved in performing the functions of the current business process. The information attained from the interviews conducted in step 10 is then used in step 20 to estimate business performance indicators. At step 30, the estimated business performance indicators are used as a basis for an estimation of the overall business model. At step 40, a new business process is developed based on the estimated business model. The new business process is implemented at step 50. Because these methods require a great deal of human interaction and involvement they are not easily updated, particularly in mid-process.

Figure 2:
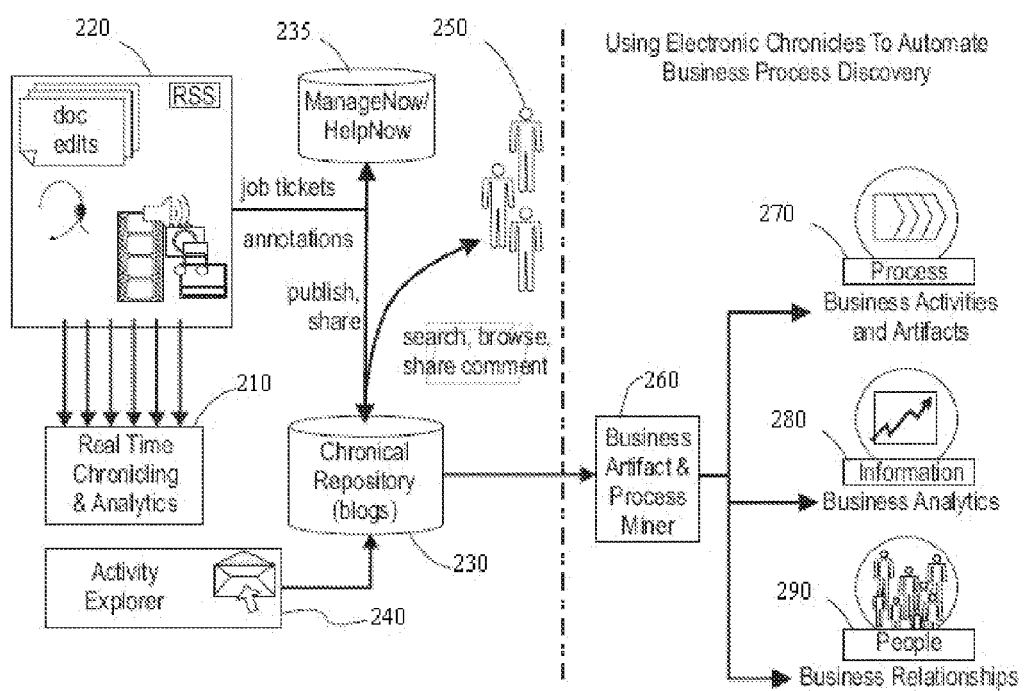
FIG. 2 illustrates an electronic chronicling system in accordance with an exemplary embodiment of the present invention.

FIG. 2 illustrates an exemplary system for eChronicling used to automate business process discovery as implemented in a help desk environment. The eChronicling system includes various components designed to provide a robust analysis of the business process. For example, the present invention in this exemplary embodiment includes electronic chronicling tools 210, a set of annotation tools 220, an electronic chronicle repository 230, a chronicle navigator 240, and an analysis and mining tool 260.

The electronic chronicling tools 210 run on various end-devices, such as personal computers (PCs), personal digital assistants (PDAs), various sensors, e.g. GPS devices, audio/video recorders, audio/video players, telephones, cell phones, cameras, as well as other peripheral devices used by different role players in the business process. These electronic chronicling tools 210 automatically log or capture selected activities as they are performed. The activity capture feature may be set to record various aspects of a business process, including, for example, type of application, state of the application, users involved, state of the business process, email sent or received, as well as other indicators. Once these aspects of the business process are captured, they are stored in a chronicle repository 230 for use by the eChronicling system. The chronicle repository 230 may be, for example, a database, such as a relational database, a structured repository, or the like. The chronicle repository 230 may also be in communication with another database 235 that stores additional information for use by the eChronicling system. This additional information may include existing reports, records, logs and other diagnostics generated by users. Users may include any combination of one or more individuals, groups, or organizations. This additional information includes information such as call records, notes, problem tickets, process records, and system events. The capture of this additional information may typically be initiated and terminated by the user.

A set of annotation tools 220 are arranged to communicate with the eChronicling tools 210 and the Chronicle repository 230 to allow users to "bookmark" interesting moments during the processes and to optionally provide additional annotation on these bookmarks. These annotations may include audio/voice clips, text notes/messages, and other memos. The annotation tools 220 capture the context of the activities being performed in real time and allow the users to supplement the bookmarks with other comments. These bookmarks and comments provide the system with more meaningfully relevant detail about the processes which may be utilized during process discovery.

The electronic chronicle repository 230 stores and organizes the temporal activity information received from the electronic chronicling tools 210. This activity information is stored and organized based on various contextual dimensions such as location and type of activity, across many role players. These role players include users and end-devices in the business process.

Chronicle navigator 240 interfaces with the chronicle repository 230 and allows for the analysis (retrieval, sorting, isolation, organization, etc.) and utilization of the information stored on the chronicle repository 230. The chronicle navigator 240 allows users to control the type and manner in which data from the chronicle repository 230 is analyzed and/or utilized. For example, the chronicle navigator 240 allows users to review the chronicles, perform searches, add annotations, as well as share the chronicles with other users 250.

Analysis and mining tool 260 is in communication with the chronicle repository 230 and automatically analyzes the chronicles to derive statistics and summaries based on processes 270, information 280, and users 290 involved. Processes 270 define business activities and artifacts and include information such as which activities are performed, which artifacts are used in these activities, the sequence in which the artifacts are used, the relationships between the artifacts, and other activity data. Information 280 defines business analytics and includes information such as the amount of time taken by various processes and process sub-components to perform functions, which users are involved in these processes, identification of bottlenecks in the processes, as well as the identification of other associated system dynamics. Users (or people) 290 define the modeling of business roles and relationships and include elements such as the automatic extraction of the network of contacts involved in a business role, the extent of interaction and involvement by these contacts, etc. The analysis and mining tool 260 allows for the focused synthesization and extraction of various data, i.e., the processes 270, information 280, and users 290 from the chronicle repository 230. The analysis and mining tool 260 allows the data to be viewed and extracted in varying levels of abstraction or granularity.

Figure 3:
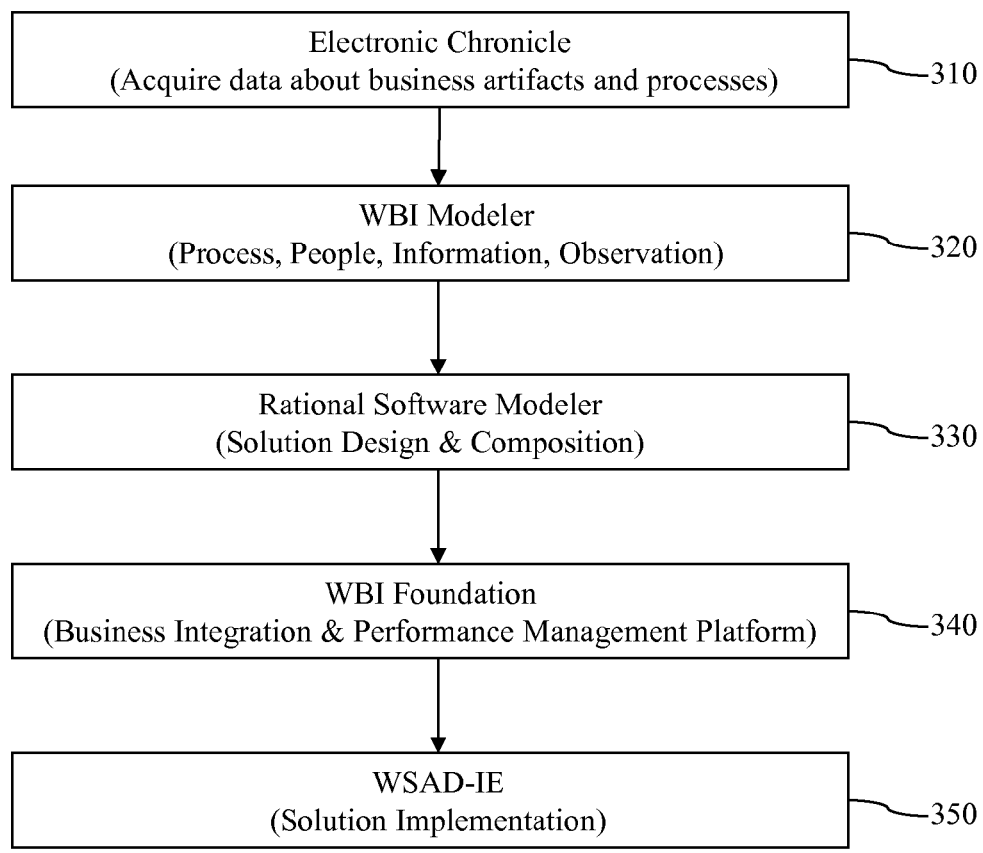
FIG. 3 illustrates a flow representing an electronic chronicling process in accordance with an exemplary embodiment of the present invention.

The resulting eChronicles provide business modelers, such as WBI modelers, a more accurate and richer description of the "as is" business process. These eChronicles can be used either directly or after modification by other users for model driven business transformation. FIG. 3 illustrates an exemplary embodiment of an eChronicle flow for automated business process discovery. The method includes acquiring eChronicles from the analysis and mining tool 260 regarding business artifacts and processes 310. These eChronicles represent process discovery data and is made available to users or business modelers, e.g. WBI modelers, 320. These users then utilize that data to develop the richness of the business process and the process description, as well as monitor and model the business process on a continual basis. In performing these functions, the users output the appropriate data to a rational software modeler 330 that develops and organizes a solution. The solution is output to WBI foundation 340 for implementation with the business integration and performance management platform. The solution is then ready to be implemented in a system 350 that is optimized for building and deploying composite applications that extend and integrate the existing Information Technology (IT) assets. One such integration platform is the WebSphere Studio Application Developer Integration Edition v5.1 (WSAD-IE) available from IBM Corporation (White Plains, N.Y.).

The eChronicling system and method also enables continual monitoring, validation, and adaptation of business processes—as opposed to one-time, highly-manual process discovery which leads to a one-time transformation. The system monitors the overall business process as well as the individual activities that comprise the overall business process. The system performs these monitoring functions by utilizing the data captured by the electronic chronicling tools and comparing that information to predefined settings or alerts. These settings and alerts may be defined based on individual activities or functions, as well as the overall business processes.

The system may similarly validate the information captured by the electronic chronicling tools to ensure compliance with process or system requirements. The system utilizes these monitoring and validation functions to continually adapt the overall business process based on predefined criteria. This continual adaptation creates a dynamic system that helps to ensure process compliance and optimization on all levels, including individual users, groups of users, organizations, and the overall system.

Figure 4:
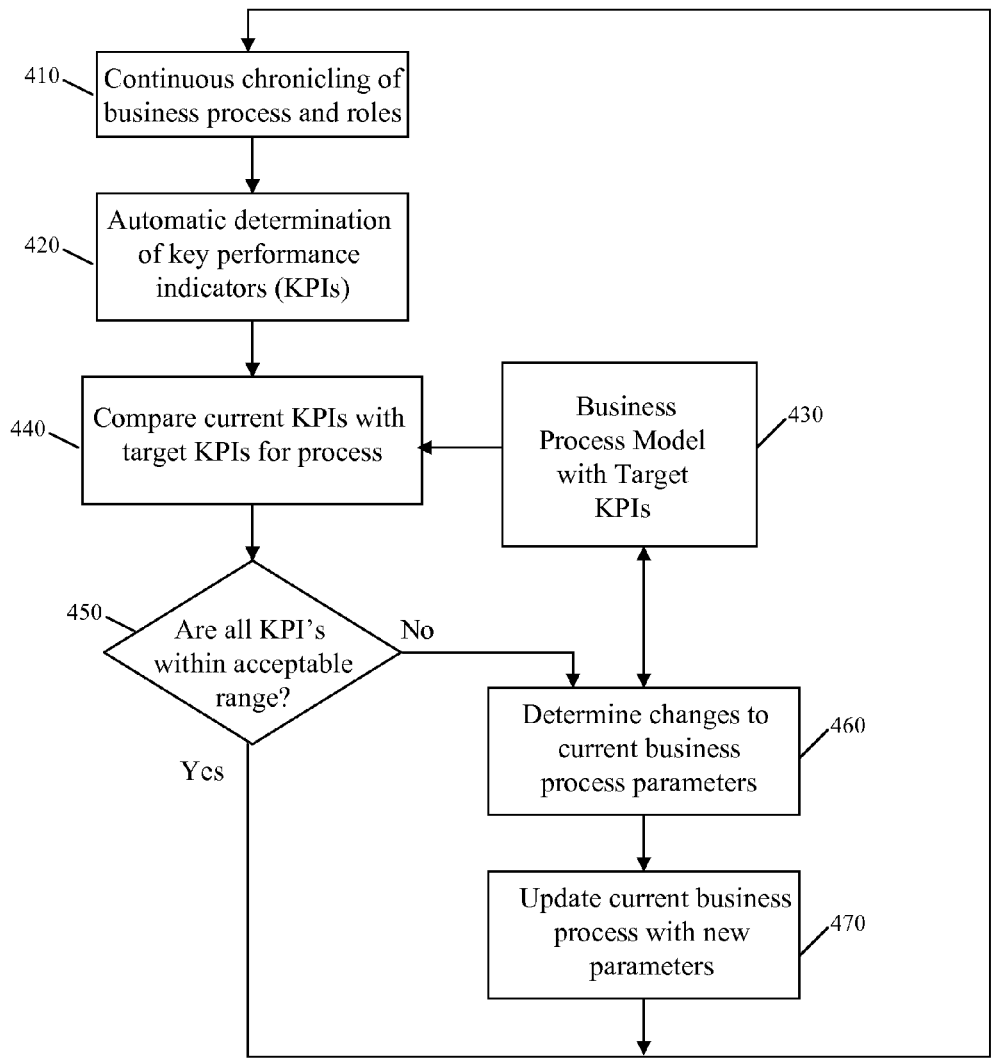
FIG. 4 illustrates a flowchart representing a transformation process in accordance with an exemplary embodiment of the present invention.

FIG. 4 illustrates an exemplary business transformation flowchart as performed by the eChronicling system of the present invention. The eChronicling system utilizes data acquired by the electronic chronicling tools to continuously an automatically update business processes to ensure that all processes comply with defined goals and criteria. The transformation begins at step 410 with the electronic chronicle receiving and chronicling data related to business artifacts, processes and roles. At step 420, this data is used by the system to automatically determine key performance indicators (KPIs). The KPIs provide an instantaneous and ongoing assessment of the efficiency of the system in any number of selected areas or criteria. At step 430, the Business Process Model with target KPIs is provided so that the current KPIs can be compared with the target KPIs. At step 440, the current KPIs are then compared with target KPIs in the selected areas or criteria. At step 450, the process determines whether all KPI are within acceptable ranges. If it is determined at step 450 that all KPIs are within acceptable ranges the process starts over by proceeding to step 410 and performing continuous chronicling. If it is determined at step 450 that all KPIs are not within acceptable ranges the process proceeds to step 460 and determines changes to be made to the current business process parameters. These changes are designed to bring the KPI within acceptable ranges. In performing this function the system communicates with the Business Process Model with target KPIs. At step 470, the current business process is updated with the newly determined parameters. The process then starts over by proceeding to step 410 and performing continuous chronicling. This process is performed in a continual loop and ensures that the all business processes are current and comply with defined goals and criteria.

The invention can take the form of an entirely hardware embodiment, an entirely software embodiment or an embodiment containing both hardware and software elements. In at least one exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As will be appreciated by one of ordinary skill in the art, the present invention may be embodied as a computer implemented method, a programmed computer, a data processing system, a signal, and/or computer program. Accordingly, the present invention may take the form of an entirely hardware embodiment, an entirely software embodiment or an embodiment combining software and hardware aspects. Furthermore, the present invention may take the form of a computer program on a computer-usable storage medium having computer-usable program code embodied in the medium. Any suitable computer readable medium may be utilized including hard disks, CD-ROMs, optical storage devices, carrier signals/waves, or other storage devices.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. The accompanying drawings illustrate exemplary embodiments of the invention.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

VI. INDUSTRIAL APPLICABILITY

The above-described invention is useful for automatically capturing, storing, and organizing various aspects of business processes in real-time which enables different role players to analyze, mine, and share sortable performance metrics in the context of the various business processes. The invention utilizes electronic chronicles to enable users to analyze and utilize performance metrics with varying degrees of abstraction or granularity. The invention is particularly useful in providing a real-time means for efficiently streamlining and optimizing business processes.

We claim:

1. A method for discovering business processes, comprising:
   utilizing at least one electronic chronicling capture tool on a device to automatically capture selected activities as they are performed;
   storing said captured selected activities in an electronic database;
   utilizing at least one annotation tool to bookmark said captured activities;
   utilizing the electronic database to organize said activities into chronicles;
   utilizing a chronicle navigator to access and utilize said chronicles;
   utilizing an analysis and mining tool to analyze said chronicles to derive statistics and summaries;
   automatically determining at least one key performance indicator;
   comparing said at least one key performance indicator with at least one target key performance indicator in order to determine whether said key performance indicator is within an acceptable range;
   determining changes to be made to a current business process when said key performance indicator is not within an acceptable range; and
   updating said current business process with said determined changes,
   wherein said device comprises at least one of personal computers, personal digital assistants, telephones, cell phones, GPS devices, audio/video recorders, audio/video players, or cameras.

2. A data processing system for discovering business processes, comprising:
   at least one electronic chronicling capture tool for automatically capturing selected activities as they are performed on a device comprising at least one of personal computers, personal digital assistants, telephones, cell phones, GPS devices, audio/video recorders, audio/video players, or cameras;
   an electronic database in communication with said electronic chronicling capture tool for organizing said activities into chronicles;
   a chronicle navigator in communication with said electronic database for enabling access and utilization of said chronicles; and
   an analysis and mining tool in communication with said electronic database for analyzing said chronicles to derive statistics and summaries related to activities and artifacts, analytics, and users; and
   an annotation tool for allowing a user to bookmark activities.

3. A computer program product comprising a non-transitory computer useable storage medium including a computer readable program, wherein the computer readable program when executed on a computer causes the computer to:
   automatically capture selected activities as they are performed using at least one electronic chronicling tool;
   organize said captured activities into chronicles in an electronic chronicle repository;
   access and utilize said chronicles with a chronicle navigator;
   analyze said chronicles with an analysis and mining tool to derive statistics and summaries that can be viewed at varying levels of granularity;
   bookmark said captured activities;
   automatically determine at least one key performance indicator;
   compare said at least one key performance indicator with at least one target key performance indicator in order to determine whether said key performance indicator is within an acceptable range;
   determine changes to be made to current business process when said key performance indicator is not within an acceptable range; and
   update said current business process with said determined changes.

4. A method according to claim 1, wherein device comprises a personal digital assistant, cell phone, or GPS device.

5. A method for organizing a business process, comprising:
   automatically capturing selected activities of a business process on devices used by different role players in the business process, said devices comprising at least one of a personal computer, personal digital assistant, telephone, cell phone, GPS device, audio/video recorder, audio/video player, or camera;
   storing said captured selected activities in a database;
   bookmarking moments during the business process and providing annotation on the bookmarks to capture a context of said activities in real-time;
   organizing activity information based on location and type of activity across role players;
   analyzing said organized activity information to derive key performance indicators;
   comparing said key performance indicators to target key performance indicators;
   if the key performance indicators are not within an acceptable range, determining changes to the business process; and
   automatically updating said business process with newly defined parameters to comply with defined goals or criteria.

6. A method according to claim 5, wherein device comprises a personal digital assistant, cell phone, or GPS device.

7. A method according to claim 5, further comprising validating the captured selected activities to ensure compliance with process or system requirements.

8. A method according to claim 5, wherein said annotation comprises audio/voice clips or text notes/messages.

9. A method according to claim 5, wherein said selected activities comprise type of application, state of application, users involved, and email sent and received.

10. A method according to claim 5, wherein said database is in communication with a second database comprising reports, records, logs, or diagnostics generated by users.

* * * * *